Jan. 4, 1944.   C. F. LUMM   2,338,191
DUCT
Filed April 28, 1943
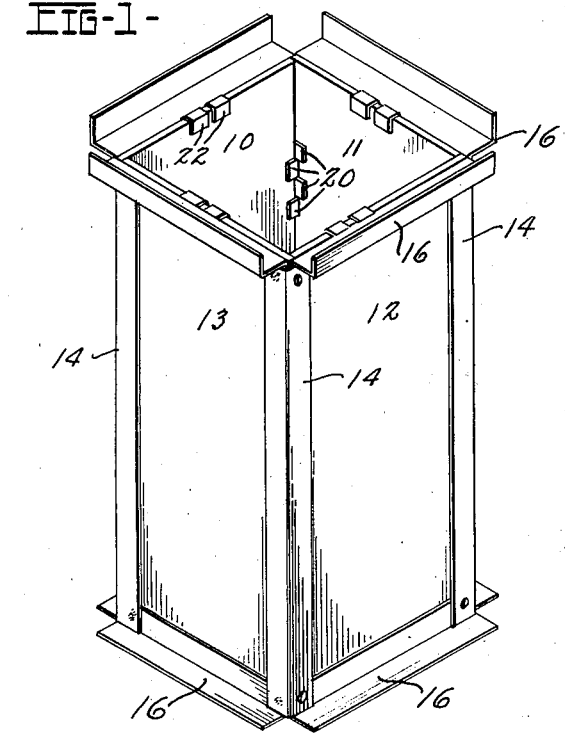
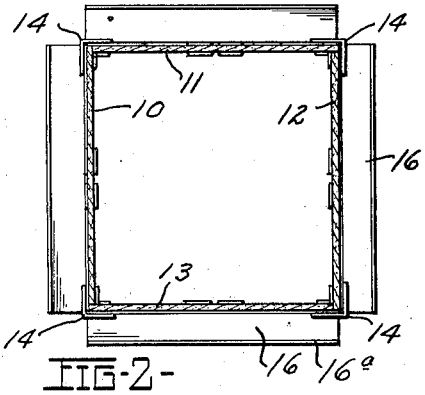
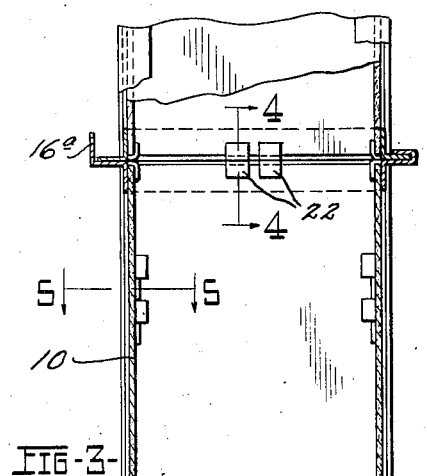
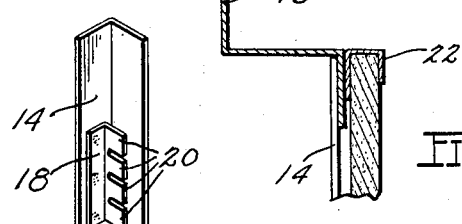
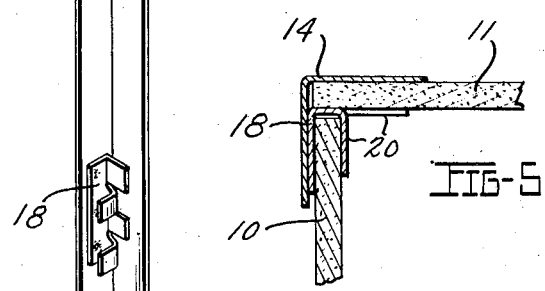
Inventor
Conrad F. Lumm
By
Attorneys Patented Jan. 4, 1944

2,338,191

UNITED STATES PATENT OFFICE 2,338,191

DUCT

Conrad F. Lumm, Toledo, Ohio, assignor of one-half to Albert H. Lumm, doing business as A. H. Lumm Company, Toledo, Ohio Application April 28, 1943, Serial No. 484,805

6 Claims. (Cl. 138—79)

This invention relates to ducts for air conditioning systems, or the like, and has for its primary object to provide a duct which can be made with a minimum of metal, but which will possess all of the desirable qualities of the all-metal duct which it is to replace.

Another object of the invention is to provide a simple and efficient fastening and assembling means for the duct parts.

Other objects of the invention will become apparent as the description proceeds, reference being had to the accompanying drawing, in which—

Figure 1 is a perspective view of a duct section constructed in accordance with the present invention; Fig. 2 is a top plan view thereof; Fig. 3 is a fragmentary central vertical sectional view of a plurality of duct sections joined together; Fig. 4 is a section on line 4—4 of Fig. 3; Fig. 5 is a section on line 5—5 of Fig. 3, and Fig. 6 is a perspective view of a corner piece used in making up the duct sections, showing the assembling elements.

Referring to the drawing, the present invention contemplates the assembly of a duct for an air conditioning system, an exhaust system for gases, or the like, from a plurality of duct sections as is common practice, but instead of using metal for all of the duct walls, substitutes panels of non-metallic material held together by metallic corner and end pieces. A completed duct section is shown in Fig. 1 and comprises panels 10, 11, 12 and 13 of non-metallic material, the character of the material depending on the service for which the duct is intended. For example, if very hot gases are to be passed through the duct, an asbestos board would be used, whereas plywood might be suitable for a duct to be used only for cool, dry air.

The panels 10, 11, 12 and 13 are held together by a metallic frame which consists of four corner pieces 14, and eight end pieces designated 16. Each of the corner pieces 14 consists of an angle section of appropriate length carrying panel-engaging clips 18 at spaced intervals along one of its inner surfaces.

The panel-engaging clips 18 are preferably formed from a single piece of metal and are stamped initially in the shape of an angle, one leg of which is solid and the other leg of which is slotted to form individual fingers 20. The solid leg of each clip is spot welded, or otherwise suitably fixed to the corner pieces in such a manner that the fingers 20 are spaced out from the corner piece by the thickness of the panel which they are intended to hold, as indicated in Fig. 5. Alternate ones of the fingers 20 are left in the position in which they are formed, while the remainder are bent back into parallelism with the solid portion of the clip to form holding fingers for another side panel, as shown in Figs. 5 and 6. Assembly of the side panels after the clips are bent is therefore merely a matter of inserting one panel back of each set of fingers.

The corner pieces are connected together at each end of the duct by end pieces 16 which may be either spot welded or riveted to the corner pieces, depending on the degree of rigidity desired in the duct, a spot welded connection being more rigid than a riveted connection. Each of the end pieces carries panel-engaging clips 22 which are bent over the ends of the panels to hold them against longitudinal displacement.

As is more or less common practice with all-metallic ducts, and as is shown in Figs. 1 and 3, the end pieces are dissimilar in that one set is provided with an initially up-turned flange 16a to form a socket for the reception of end pieces of the other type, which flange may be crimped over to lock the duct sections together.

In operation, the metallic frame may be assembled and the panels 10, 11, 12 and 13 inserted behind the clips 18, the fingers 20 of which are then bent to panel-engaging position. The end clips 22 are then bent over the ends of the panels to prevent longitudinal displacement and the duct section is completed. In assembling a duct, it is only necessary to stack the sections one on top of the other if the duct is to be vertical and to crimp the upstanding flanges 16a in to hold the sections together. If the duct is to carry noxious gases, it may be desirable to caulk the opening between the side panels, so as to make it air tight. This can be done after the duct is formed by the use of an ordinary caulking gun.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a duct of the class described, a plurality of built-up end to end sections each comprising a metallic frame polygonal in cross-section having longitudinally extending corner pieces angled in cross-section with their angles facing inwardly and having cross pieces at each end connecting the ends of the corner pieces at each side of the frame, some at least of said corner and cross pieces having clips with angled fingers attached thereto at their inner sides, and non-metallic panels connecting the corner and cross pieces at each side of the frame to cooperate therewith to form a closed side and being held in position by said clip fingers.

2. An arrangement as called for in claim 1 wherein the cross pieces at one end of the frame have laterally extending flanges and at the other end have similar flanges with edge lips to form sides for and to engage over the cross piece flanges of an adjoining duct section.

3. A duct section of the class described, comprising longitudinally extending corner pieces angular in cross-section, cross pieces rigidly connecting the corner pieces at each end to form a duct frame of polygonal form in cross-section and providing openings at each side of the frame, clips on some of said pieces and having angled fingers, and a panel at each side of the frame closing the opening therein and seating against said corner and cross pieces of the frame and held in position by the angled fingers of said clips.

4. A duct section polygonal in cross-section comprising a frame having longitudinally extending corner pieces angular in cross-section with their open sides facing inwardly and their flanges extending toward adjacent flanges of adjoining corner pieces at the same side of the frame, and cross pieces at each end of the frame lapping and connecting the adjacent flanges of adjoining corner pieces, and a panel at each side of the frame cooperating with the corner piece flanges and the cross pieces at a respective side to close such side and being disposed at the inner sides of said flanges and cross pieces, and means attached to the frame to frictionally hold the panels in position therein.

5. An arrangement as called for in claim 4 wherein said cross pieces at both ends of the duct section have outstanding flanges for the flanges of one section to seat on those of an adjoining section, and some of said flanges having lips at their edges for engaging over the seating flanges to retain them in seated position.

6. A duct section of polygonal form in cross-section comprising a metallic frame having corner pieces and cross pieces connecting the corner pieces at each end, the corner pieces being angular in cross-section with their open sides facing inward and with the flanges thereof at the same side of the frame disposed in common planes, one or more clips on an inner side of each corner piece and having a plurality of fingers projecting in different directions and a non-metallic panel at each side of the frame at the inner sides of and seating against said corner and cross pieces and held thereto by predetermined fingers of said clips.

CONRAD F. LUMM.